United States Patent [19]

Dentino

[11] 3,768,096
[45] Oct. 23, 1973

[54] FOCUSING CONTROL OF SYNTHETIC APERTURE PROCESSING FOR SIDELOOKING RADAR
[75] Inventor: Mauro J. Dentino, Placentia, Calif.
[73] Assignee: North American Rockwell Corporation, El Segundo, Calif.
[22] Filed: Sept. 30, 1968
[21] Appl. No.: 763,891

[52] U.S. Cl.................. 343/7 A, 343/5 CM, 343/9, 343/17.1 R
[51] Int. Cl............................................... G01s 9/02
[58] Field of Search...................... 343/5 PC, 7 A, 9, 343/17.1 R, 5 CM

[56] References Cited
UNITED STATES PATENTS
3,121,868  2/1964  Hausz et al. ...................... 343/5 CM
3,178,711  4/1965  Case .......................... 343/5 CM X Primary Examiner—T. H. Tubbesing
Attorney—William R. Lane, L. Lee Humphries and Rolf M. Pitts

[57] ABSTRACT

In a sidelooking radar adapted for airborne use in a synthetic aperture application, means for continuous doppler focusing of the radar receiver output. A phase sensitive detector, coupled to the output of a clutter-referenced intermediate frequency receiver stage, has a reference input coupled to an intermediate frequency source by compensatory phase shift means responsive to the platform velocity and system pulse repetition frequency of the radar.

13 Claims, 5 Drawing Figures

INVENTOR.
MAURO J. DENTINO

INVENTOR.
MAURO J. DENTINO

ATTORNEY

FOCUSING CONTROL OF SYNTHETIC APERTURE PROCESSING FOR SIDELOOKING RADAR

CROSS REFERENCE TO RELATED APPLICATIONS

U.S. Pat. application Ser. No. 670,363 filed Sept. 21, 1967, by Charles L. Vehrs, Jr., for Digital Doppler Processor.

BACKGROUND OF THE INVENTION

The azimuthal resolution of an airborne radar system, employed in a group mapping application, tends to be limited by the physical size or aperture of the antenna. Although larger physical antennas provide narrower beamwidths for improved resolution, such size is obviously limited for airborne applications by the geometrical and weight limitations imposed by a utilizing aircraft.

A technique for overcoming such resolution and aperture limits imposed upon a physical antenna for airborne use, is one in which the non-maneuvering flight path of the moving radar platform cooperates with a sidelooking radar (antenna looking sideways of the flight vector): each position of the moving radar platform, upon successive pulsing of the radar, corresponds to that for an antenna radiator element in a synthetic antenna array. Such array extends along the flight path, looking sideways thereto, and is many times larger than that of the physical antenna employed. Suitable processing of the echo returns from a selected number of such successive pulse transmissions, provides radar ground mapping data of improved resolution in azimuth.

The batch processing technique of utilizing the data over several pulse repetition intervals of an airborne sidelooking radar to effect a synthetic aperture of increased size over that of a physical antenna for improved azimuth resolution (in a mapping application) is well understood in the art, being described for example in U.S. Pat. No. 3,178,711 to R. O. Case for High Resolution Scanning Radar; U.S. Pat. No. 3,271,765 to S. R. Pulford for Data Compression System. Effective utilization of such data for a mapping application requires focusing of the data for each range of interest within radar surveillance. Such focusing refers to determining the correspondence between a given data element within the physical beamwidth of the antenna and at a selected range time (within given pulse repetition interval) with its corresponding data element occurring at a successive pulse repetition interval and at such range. Such focusing technique is essentially a doppler processing technique by which such data element at such range is distinguished from other data elements (in other directions) at such range by the difference between the doppler shifts associated therewith. At successive pulse repetition intervals, such selected data element of interest appears at a different portion of (i.e., at a different direction within) the antenna beamwidth due to the velocity vector of the airborne radar platform. Accordingly, a different doppler shift is associated with a given data element for each of the successive pulse repetition intervals it remains under the survellance of the radar system. Therefore, the range-gated doppler-shift responsive technique for effecting registration of the data of successive pulse repetition intervals for a selected terrain data element is a processing technique referred to as frequency-focusing or azimuth registration. Such frequency focusing technique involves compensating for changes in the doppler shift of a given terrain element-to-be-mapped, as viewed from an airborne (moving) radar, due to motion of the radar platform and changes in the target look angle.

Although a coherent receiver system may be desired for such mapping technique, the utilization thereof with a doppler processor requires compensation for changes in velocity ($V_a$) and look-angle ($\theta$) in accordance with the function $V_a \cos \theta$. One method of effecting such compensation is to introduce a frequency shift in the local oscillator signal to one of the receiver mixers. Another type of such form of compensation is shown in U.S. Pat. No. 3,223,997 issued to J. O. Clark et al., for Doppler Correction in a Frequency Diversity Frequency Jittered Pulse Doppler Radar by Means of Digital Phase Computation, and involves the generation of a compensatory phase shift corresponding to that phase shift which the received radar signal has undergone due to target relative motion, the rate of change (radians/second) of such compensatory phase change (radians/second) of such compensatory phase (radians) being referred to in such patent as frequency jitter ($d\phi/dt = \Delta\omega$). The device of Clark, however, provides such compensation for only a single target in a frequency diversity mode of a coherent pulse doppler radar system. In other words, such technique provides the function of a clutter tracker in a coherent AMTI system, and does not provide compensation for a multiple target return representing a plurality of data elements of a range bin and azimuth resolution bin data matrix, such as in a ground-mapping mode.

An analytical description of one aspect of a focusing technique for synthetic arrays is to be found in an article "Synthetic Aperture Mapping Radar" by Jean A. Develet, Jr., at pages 173–199 of the IEEE Transaction on Aerospace and Navigation Electronics, for Sept. 1964.

A matched filter technique for effecting such focusing is described in the above-noted U.S. Pat. No. 3,271,765 to Pulford. However, such technique requires a large amount of matched filter elements as to be costly and bulky to mechanize.

In other words, the range gated matched filter techniques of the prior art have required extensive equipment to effect frequency focusing in a synthetic array application of a coherent radar system for ground mapping purposes.

SUMMARY OF THE INVENTION

By means of the concept of the subject invention the above-noted shortcomings of the prior art are voided and means is provided for conveniently focusing the data over all ranges of interest in a synthetic antenna type radar system.

In a preferred embodiment of the invention there is provided a side-looking coherent radar adapted for airborne use in a synthetic antenna application. Such radar system includes a stable intermediate frequency source and clutter-referenced intermediate frequency receiver stage. There is further provided doppler data focusing means comprising a phase sensitive detector having a first input coupled to an output of the intermediate frequency receiver stage and having a reference second input. Complensatory phase shift means intercouples an output of the reference source and the reference input of the phase sensitive detector, the phase shift means being responsive to the platform velocity look angle and system pulse repetition frequency of the radar for modulating the reference input to the phase sensitive detector.

In normal operation of the above described arrangement, the phase modulation of the reference input to the phase detector at a given range is advanced each successive pulse repetition interval at a rate ($d\phi/dt = \Delta\omega$) corresponding to the difference doppler shift in the data from such range, whereby doppler focusing is achieved at such range; while the focus effect is varied as an inverse function of radar range time during each pulse repetition interval so as to provide adequate continuous focusing over a preselected region of radar ranges of interest. In this way, the data from a given range is matched to an associated range-gated filter bank, whereby each filter of the filter bank corresponds to a preselected azimuthal resolution element of an azimuthally resolved range bin. In other words, as a given data element at a given lateral range distance, is viewed in a successive azimuthal position from the moving airborne, sidelooking radar at successive pulse repetition frequencies, the frequency thereof is compensatorily adjusted, whereby such data element appears as an input occurring within the bandpass of a given filter element; further, the time-phase of such data is also compensatorily adjusted whereby such successive inputs to the filter are in phase, as to cumulatively combine in the filter processing. Accordingly, it is an object of the invention to provide simple means for effecting doppler focusing of a synthetic antenna array type radar system for a wide region of ranges of interest.

It is another object of the invention to compensatorily frequency-shift and phase-shift the data of a sidelooking radar in a mapping application for improved focusing thereof.

It is still another object to doppler compensate the data of a synthetic array antenna as a function of range time to match such data for use in a preselected filter bank.

Yet a further object of the invention is to provide a synthetic array type radar for mapping purposes which employs a minimum number of filter elements in an azimuth resolution filter bank.

These and other objects of the invention will become apparent from the following description taken together with the accompanying illustrations in which:

BRIEF DESCRIPTION OF THE FIGURES

In the figures, like reference characters refer to like parts.

DESCRIPTION OF THE PREFERRED EMBODIMENT

Figure 1:
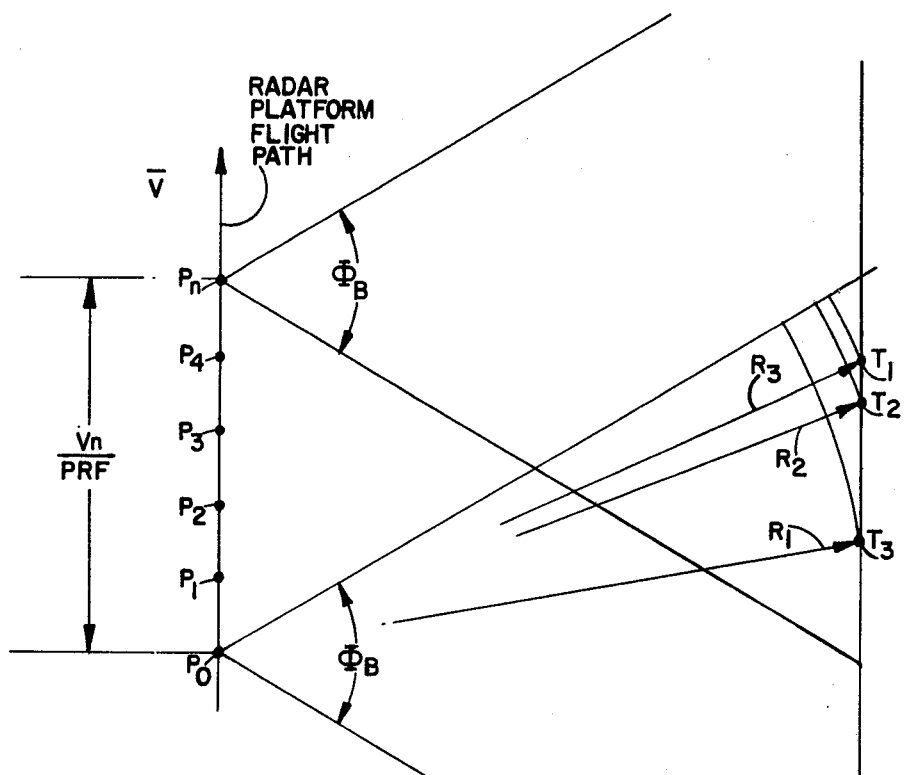
FIG. 1 is a diagram illustrating, in plan view, the geometry of a terrain mapping situation in which the concept of the invention may be advantageously employed.

Referring to FIG. 1 there is illustrated in plan view the geometry of a terrain mapping situation in which the concept of the invention may be advantageously employed. A target array of targets $T_1$, $T_2$ and $T_3$ lying at a common perpendicular distance from the nonmaneuvering flight path of a radar platform and further lying within the beamwidth $\Phi_B$ of a side-looking radar system situated aboard the moving platform, as the platform moves from an initial position $P_o$ to successive ones of positions $P_n$ along the flight path. Such positions as illustrated are intended to show successive changes of position of the radar system upon pulsed transmission thereof, each such change of position corresponding to the incremental distance, $V\Delta t = V/PRF$, where $V$ is the platform velocity and $1/PRE$ is the system pulse repetition interval associated with the system pulse repetition frequency. Each of such platform positions from which the radar system is pulsed thus corresponds to a radiator element in an antenna array of radiator elements, the physical size or extent of such array corresponding to $Vn/PRF$, where n is one integer less than the number of transmitted pulses.

It is to be appreciated from the geometry of FIG. 1 that for position $P_o$ of the platform, for example, the targets $T_1$, $T_2$ and $T_3$ are all at slightly different ranges from the platform, and at slightly different directions within the beamwidth $\Phi_B$. It is also to be appreciated that the direction of a given target, say $T_1$, relative to the platform velocity vector, changes as the platform progressively moves along the flight path.

Targets $T_1$, $T_2$ and $T_3$, in occurring at slightly different directions from the moving platform, may be distinguished from each other by means of the doppler shift difference between the echo returns therefrom. The observation of such doppler shift difference, however, requires an observation period or doppler processing interval of many successive pulse repetition intervals, as is well understood in the art, due to the doppler frequency shifts of interest being so low relative to the data sampling frequency represented by the pulse repetition frequency of the pulsed emergy system or radar.

Where the different doppler shifts for the different targets to remain the same over the doppler processing interval, a bank of range-gated narrow bandpass filters would enable separation of the doppler-processed signals representing a target in one range bin and at one direction from a target within such range bin at a different direction, whereby a single filter element would be associated with a given direction within such range. However, in view of the change of direction of a given target relative to the radar platform as the platform moves along the flight path during the doppler processing period, the doppler shift associated with such target will change. Further, the radar range or slant range-distance to the target also changes, as to change the time-phase of the doppler shift.

Accordingly, in order to correlate the doppler returns from a given target over the several pulse repetition intervals of the doppler processing period, it is necessary to include compensation of the correlation process for such changes in doppler frequency and time-phase. Effecting such compensation for data from all radar ranges of interest results in the data required to map a desired sector-of-interest.

Figure 2:
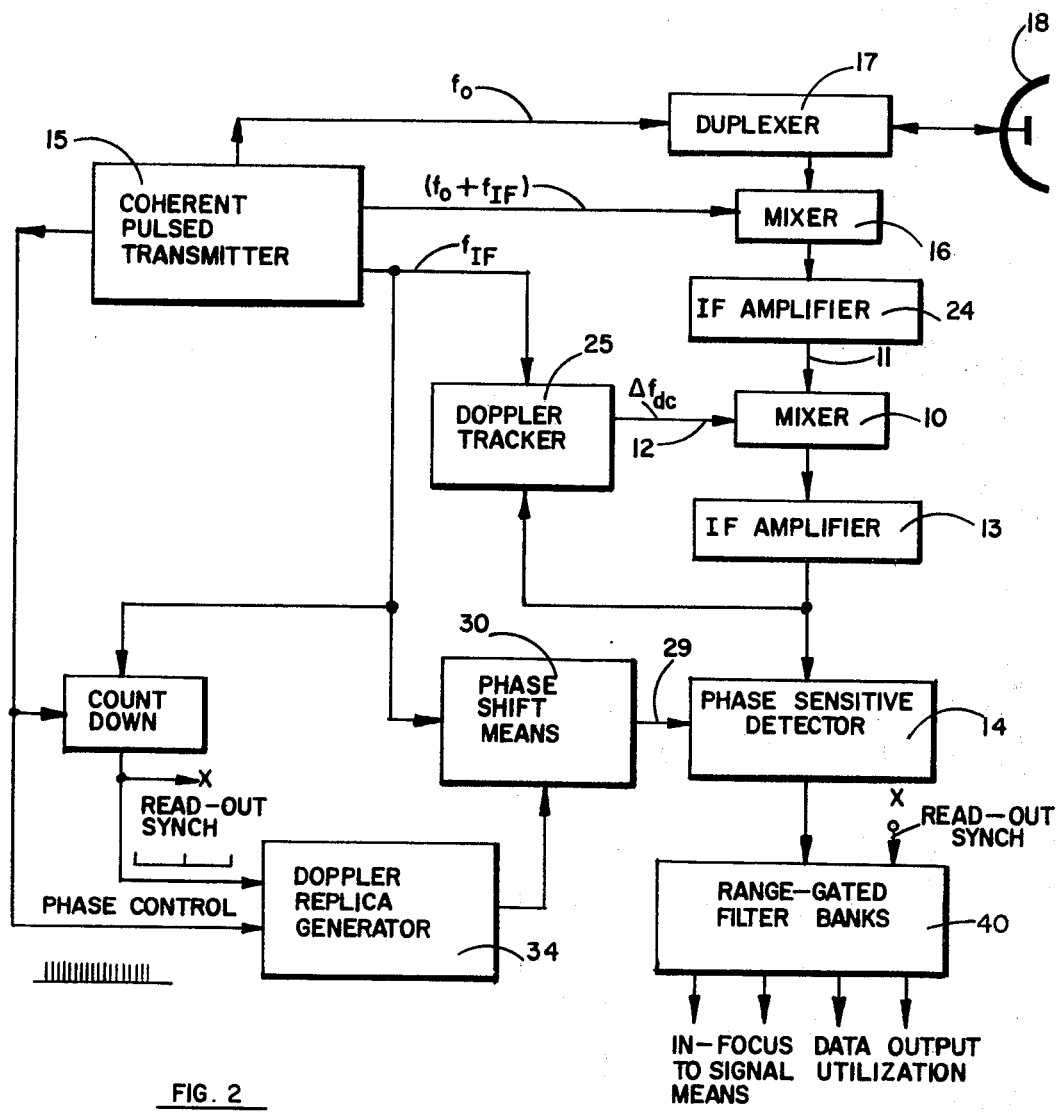
FIG. 2 is a block diagram of a system embodying the concept of the invention.

A convenient device for including such compensation in the coherent detection, or correlation processing, of the received echoes is shown in FIG. 2.

Referring to FIG. 2, there is illustrated in block diagram form a system embodying the concept of the invention. There is provided coherent transmitter means comprising a pulsed transmitter 15 for pulsed transmission of a coherent preselected carrier frequency $f_o$. Transmitter 15 is coupled to an antenna 18 by a circulator 17 or other transmit/receiver control means. Circulator 17 also couples antenna 18 to a receiver-mixer 16, which is further reponsive to a coherent source of a local oscillator frequency $(f_o + f_{IF})$ for providing an intermediate frequency output. Such intermediate frequency output, which is amplified by narrow bandpass means 24, will have a spectral distribution the centroid of which differs from a preselected intermediate center frequency $f_{IF}$ by an amount $\Delta f_{dc}$, corresponding to the doppler shift of the on-boresight returns received by antenna 18. Accordingly, a closed loop doppler centroid clutter tracker is provided.

Such closed loop arrangement includes a second mixer 10 having a first input 11 coupled to the IF output of amplifier 24 and further having a second, or auxiliary local oscillator injection, input 12. Doppler frequency tracking means 25 is input-coupled to an output of mixer 10 by a second IF amplifier 13 and further coupled to a coherent source of the preselected IF frequency $f_{IF}$ for generating an auxiliary local oscillator injection signal having a frequency $\Delta f_{dc}$ indicative of the frequency difference between the inputs applied to frequency tracker 25. The output of frequency tracker 25 is applied as a local oscillator injection at input 12 of mixer 10 for frequency translation of the centroid frequency of the receiver IF spectrum (i.e., the output of amplifier 13) to the preselected IF center frequency, $f_{IF}$.

The construction and arrangement of elements 15, 16, 17, 18, 24 and 25 are known in the art, being substantially the same as the like referenced elements of FIG. 1 of U.S. Pat. No. 3,347,187 issued to W. R. Fried for Platform Motion Compensation of a Coherent MTI System. Accordingly, these elements are illustrated in FIG. 2 in block form only, as are elements 10 and 13, for convenience in exposition.

Coherent detection of the clutter-referenced IF output of amplifier 13 is accomplished by means of a phase-sensitive detector 14 having a reference input 29 responsively coupled to the coherent source of the preselected IF frequency $f_{IF}$. Interposed between coherent source 15 of IF reference frequency $f_{IF}$ and reference input 29 of phase sensitive detector 14 is phase shifter means 30 for compensatorily shifting the phase of the reference signal applied to input 29 of detector 14. A control input of phase shift means 30 is responsively coupled to the output of a doppler replica generator 34, for effecting control of the compensatory phase shift provided by phase shift means 30. Doppler replica generator 34 is responsively coupled to a system trigger of transmitter 15 for effecting the necessary compensatory phase shift each pulse repetition period over the interval of a preselected number of pulse repetition intervals $(t = n/PRF)$ required for doppler processing. Such periodicity $t$ may also be used as a read-out synchronization control signal for sequentially gating-on subsequent range bin-groups of the range-gated filter banks, in generating a synthetic range-trace signal output.

Figure 3:
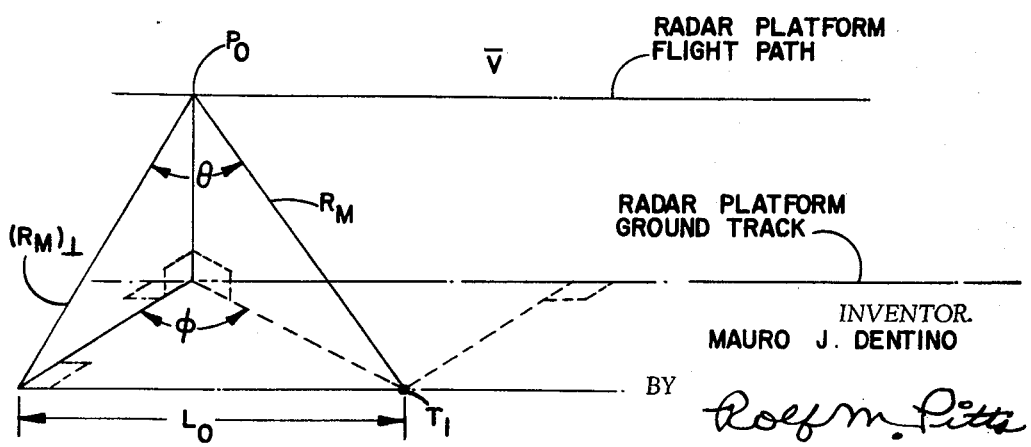
FIG. 3 is a diagram illustrating the analytical geometry of the doppler compensation provided by the doppler replica generator of FIG. 2.

The criterion for the compensatory phase shift provided by the cooperation of replica generator 34 and phase shift means 30 in FIG. 2 may be better appreciated from a consideration of FIG. 3, in which is illustrated an isometric view of the geometric relationship of a selected ground point or target $T_1$ and an airborne radar platform position $P_o$. The relation of the initial slant range distance $R_M$ to the target $T_1$ is:

$$R_M^2 = Z^2 + Y^2 + L_o^2 \tag{1}$$

where:
$Z$ = altitude of radar platform relative to target, $T_1$.
$Y$ = projected target distance, perpendicular to ground track of radar platform flight path.
$L_o$ = initial projected target position, along radar platform flight path.

Substituting the slant range $(R_M)$ $\frac{2}{1}$ for $(Z^2 + Y^2)$:

$$R_M^2 = (R_M) \frac{2}{1} + L_o^2 \tag{2}$$

The slant range distance $R_M$ to the target $T_1$ as a function of time is:

$$[R_M(t)]^2 = (R_M M) \frac{2}{1} + (L_o - Vt)^2 \tag{3}$$

$$R_M(t) = [(R_M) \frac{2}{1} + L_o^2 - 2VtL_o + V^2t^2]^{1/2} \tag{4}$$

Substituting Equation (2) in Equation (4):

$$R_M(t) = [R_M^2 - 2V_o + V^2t^2]^{1/2} \tag{5}$$

Rearranging Equation (5):

$$R_M(t) = R_M[1 - 2VtL_o/R_M^2 + V^2t^2/R_M^2]^{1/2} \tag{6}$$

$$R_M(t) = R_M[1 - 2(Vt/R_M)\sin\theta + (VL/R_M)^2]^{1/2} \tag{7}$$

where corresponds $\sin\theta = L_o/) = M + X \frac{1}{2}$
which correspoinds to the form, $$R_M(t= R_M[1 + X]^{1/2} \tag{8}$$

where:

$$X = -2(Vt/R_M)\sin\theta + (Vt/R_M)^2 \tag{8}$$

Now, the binominal series expansion states that $$(1 \pm x)^n = 1 \pm nx + n(n-1)x^2/2! \pm n(n-1)(n-2)x^3/3! \pm n(n-1)(n-2)(n-3)x^4/4!$$

$$\tag{9}$$

For the case where $x<<1$ and $n = \frac{1}{2}$, then Equation (9) may be approximated as:

$$(1+x)^{1/2} = 1 + x/2 - x^2/8 + x^3/16 + 5x^4/128 \tag{10}$$

Substituting the term $(-2Vt/R_M \sin\theta + (Vt/R_M)^2$ of Equation (8) for $x$ in Equation (10), each of the terms of the right hand member of Equation (10) may be determined:

$$x = -2Vt/R_M \sin\theta + (Vt/R_M)^2$$

$$X^2 = +4(Vt/R_M)^2 \sin^2\theta - 4(Vt/R_M)^3 \sin\theta + (Vt/R_M)^4 \tag{11}$$

$$X^3 = -8(Vt/R_M)^3 \sin^3\theta + 12(vt/R_M)^4 \sin^2\theta - 6(Vt/R_M)^5 \sin\theta + (Vt/R_M)^6$$

$$x^4 = +16(Vt/R_M)^4 \sin^4\theta + \text{higher order terms.}$$

Employing such terms in Equation (10) and substituting such equation in the bracketed portion of the right-hand member of Equation (8), the target range equation may be rewritten as follows:

$$R(t) = R_M[1 - Vt/R_M \sin\theta + \tfrac{1}{2}(Vt/R_M)^2 \cos^2\theta \ldots (\text{etc})] \quad (12)$$

The corresponding time-phase $\phi_{T_1}$ of a radar signal traversing the two-way phase distance represented by the radar range $R(t)$ for target $T_1$ is:

$$\phi T_1 = 4\pi/\lambda R(t) = 4\pi/\lambda\ R_M + 4\pi/\lambda[-Vt\sin\theta + (Vt)^2/2R_M \cos^2\theta \ldots] \quad (13)$$

$\lambda$ = radar energy free space wavelength.
Such time-varying phase shift for a given target is seen from Equation (13) to include a constant term ($\phi_0 = 4\pi R_M/\lambda$) and a time-varying term ($\phi(t)$):

$$\phi_{T_1} = \phi_o + \Delta\phi(t) \quad (14)$$

where:

$$\Delta\phi(t) = 4\pi/\lambda[-Vt\sin\theta + (Vt)^2/2R_M \cos^2\theta \ldots]$$

Only the variation of the time-phase is of interest, corresponding to the range-change affect and the direction-change or doppler change affect required to achieve data focusing. Accordingly, means is provided in the doppler replica generator 34 of FIG. 2 for mechanizing the function $\Delta\phi(t)$.

When the azimuth direction of the antenna boresight axis is perpendicular to the radar platform flight path (i.e., $\theta = 0$; in FIG. 3), then the expression for $\Delta\phi(t)$ reduces to the following:

$$\Delta\phi(t) = 4\pi/\lambda[+\tfrac{1}{2}(Vt)^2/R_M - \tfrac{1}{8}(Vt)^4/R_M^3] \quad (15)$$

Ignoring the fourth order term, the right hand number of Equation (15) reduces to $$\Delta\phi(t) \approx 2\pi(Vt)^2/\lambda R_M \quad (16)$$

Figure 4:
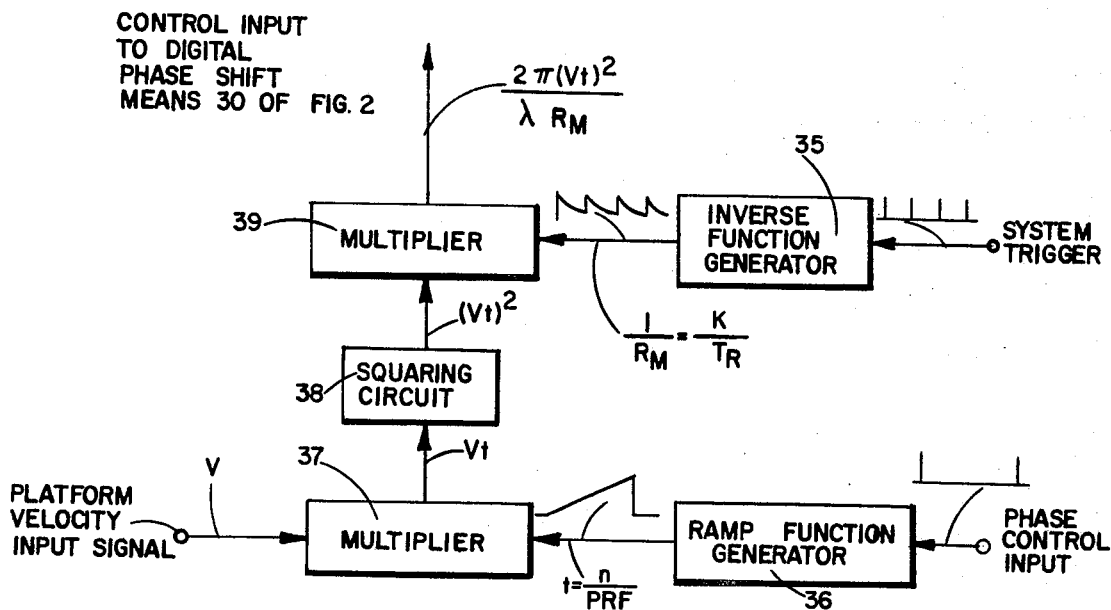
FIGS. 4 and 5 are block diagrams illustrating in further detail alternate arrangements of the doppler replica generator of FIG. 2.

In the mechanization of such latter expression by generator 34 of FIG. 2, as shown more particularly in FIG. 4, the factor $2\pi/\lambda$ is essentially a scaling constant, while the velocity term V may be obtained from an onboard automatic navigator; the inverse range term $1/R_M$ is generated for all ranges of interest as an inverse function of radar range time each pulse repetition interval by a first function generator 35 responsively coupled to a system trigger of the pulsed radar system of FIG. 2; and a signal analog of the cyclic interval, $t$, is generated by a ramp function generator 36. The construction and arrangement of inverse function generator 35 is known in the art, as indicated, for example by element 47 in FIG. 5 of U.S. Pat. No. 3,325,807 issued to M. R. Burns, et al., for Ground Clearance Warning System, while the construction and arrangement of a ramp, or sawtooth, generator 36 is also known in the art, as indicated for example by element 69 in FIG. 4 of U.S. Pat. No. 3,165,740 issued to W. E. Stoney for Terrain Clearance Radar, although a staircase generator may be alternatively employed, as exemplified by element 23 in FIG. 2 of U.S. Pat. No. 3,241,068 issued to J. A. Moulton for electronic Multiplier for Terrain Avoidance Radar System. Accordingly, elements 35 and 36 are shown in block form only for convenience in exposition.

The velocity signal V and the output, $t = n/\text{PRF}$, of function generator 36 may be multiplied by a first mulliplier 37 obtain a signal indicative of the product $Vt$, and the product square by signal squaring means 38 to obtain the function $(Vt)^2$. Such signal squaring means and multiplier means are known in the art, per se, as indicated for example by elements 99, 101, 110 and 173 in FIG. 17 of U.S. Pat. No. 3,396,391 issued to J. O. Anderson, et al., for Terrain Following System. A second muliplier 39 responsive to the outputs of squaring means 38 and inverse function generator 35 provides an output indicative of the scaled product $2\pi(Vt)^2/\lambda R_M$, corresponding to the compensatory incremental phase shift of interest, $\Delta\phi(t)$. Such output is employed as a control input to the phase shift means 30 of FIG. 2, the resulting rate of change of the phase shift occurring on line 29 for a given range bin (over successive pulse repetition intervals) being referred to herein as a replica of the predicted doppler shift of the data to be processed at detector 14. Hence, element 34 (in FIG. 2) is referred to as a doppler replica generator.

In normal cooperation of the replica generator arrangement of FIG. 4 in the system of FIG. 2, the generation of a compensatory phase shift is initiated with the initiation of a preselected number of successive pulse repetition intervals corresponding to the synthetic array to be generated (see FIG. 1). Such compensation is progressively varied over such preselected number ($n = N$) of pulse repetition intervals, the time rate of change of such compensatory phase shift (for a given radar range time) corresponding to a periodic function or replica of an incremental doppler frequency ($d\phi/dt = \Delta\omega = 2\pi\Delta f$) having a selected initial time phase relationship. Such periodic function or doppler replica is varied within each pulse repetition interval as an inverse function of radar range time, whereby compensation or doppler focusing (over the preselected number of pulse repetition intervals of interest) is provided for all radar ranges of interest.

The omni-range doppler focusing thus provided serves to focus the on-boresight data received by the physical antenna of the system of FIG. 2, whereby a narrow bandpass filter of fixed center frequency may be utilized to distinguish such on-boresight data (for a given range bin) from data for such range bin received from slightly different azimuth directions. Further, other narrow bandpass filters having different fixed center frequencies may be used to distinguish data at different ones of a plurality of azimuth directions within the beamwidth of the physical antenna, whereby a bank of range-gated filters may be utilized for such range bin, and a plurality of range-gated filter banks 40 may be utilized (in FIG. 2) to cover the radar ranges of interest in a manner well understood in the art.

Because the compensatory phase shift over the interval of a preselected number of pulse repetition intervals ($t = N/\text{PRE}$) for a given range bin preserves the coherence between the received signals from a given terrain point target over successive pulse repetition intervals, such signal energy may be combined or integrated over the doppler processing period by the response of the narrow bandpass filter associated with such terrain point target. Also, the response of the phase sensitive detector 14 (in FIG. 2) to the two inputs thereto (i.e., the doppler replica reference input and the IF receiver signal input) is that of a product detector (as discussed more fully at Columns 9 and 10 of U.S. Pat. No. 3,241,077 issued to R. K. Smyth, et al., in connection with the description of phase discriminator 33 in FIG. 8 thereof). Accordingly, such process of multiplication and integration for achieving azimuth resolution comprises an azimuth cross-correlator or focused processor.

Although the mechanization of FIG. 4 has been described in terms of utilization in a symthetic array system employing a side-looking ($\theta + 0$) antenna, the concept is not so limited and a $\cos \theta$ function generator may be employed to modulate the velocity signal V prior to injection into multiplier 37 (in FIG. 4), to implement a squinted aperture mode described by the general description for $\Delta\phi(t)$ in Equation (14).

An offset frequency may also be included in the IF frequency input to phase shift means 30 (in FIG. 2) or alternatively injected in the output of phase shift means 30, in order to frequency-translate the output of phase detector 14 to a frequency or bandwidth region conveniently compatible with the design and use of narrow bandpass filters for the range-gated filter banks 40. Such offset frequency also prevents doppler fold-over of the doppler spectrum about the clutter spectrum centroid at the output of detector 14, whereby a doppler frequency shift above that of the centroid frequency may be distinguished from one shifted a like amount below the controid frequency.

Figure 5:
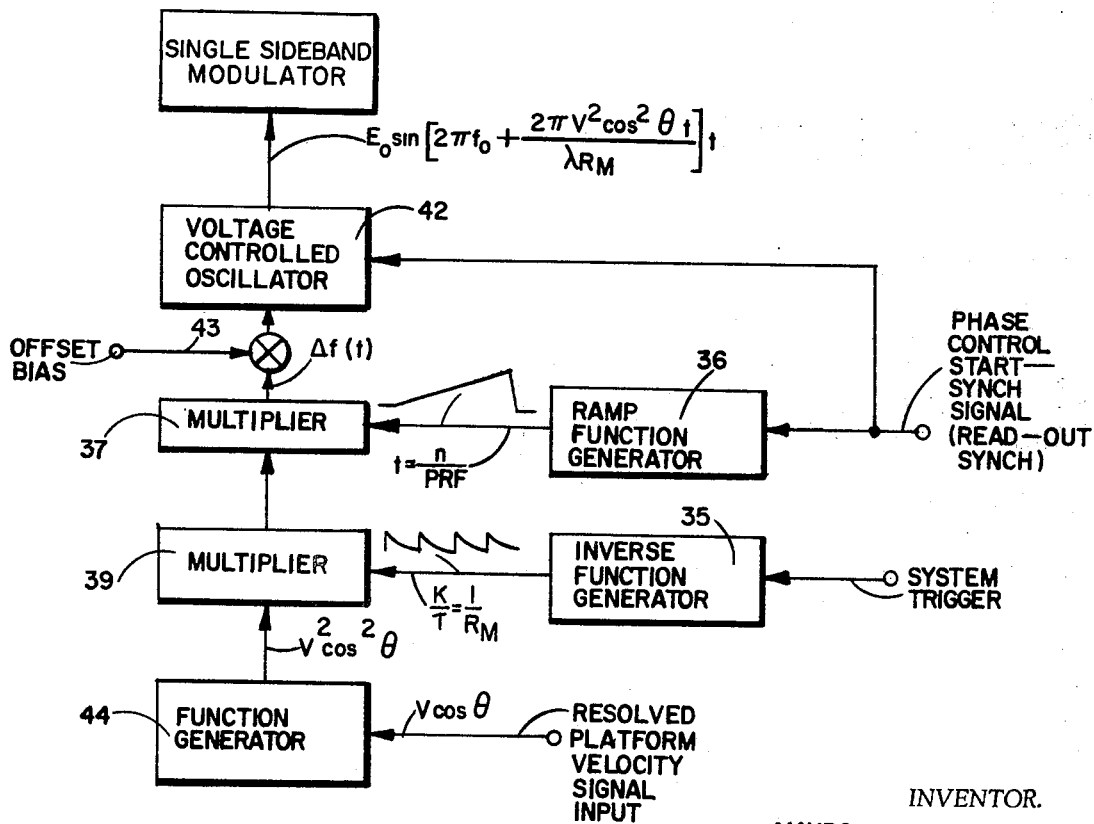

An alternate embodiment of the replica generator of FIGS. 2 and 4, and incorporating the above noted functions, is shown in FIG. 5. A voltage controlled oscillator VCO 42 serves as an offset frequency generator, the cyclical variation ($\sin(2\pi ft+\phi_o)$) of the output thereof being used as a phase shifter control input to produce a corresponding variation in the phase shift ($d\phi/dt = \Delta\omega$) provided by phase shift means 30. In other words, an offset bias applied at a summing input 43 to oscillator 42 serves as an offset frequency signal or phase-rate control signal ($2\pi f_o$). The starting phase of oscillator 42 is controlled by the same phase control signal employed in generation of the doppler replica.

Because the frequency term ($2\pi f$) in the argument ($2\pi ft+\theta_o$) of the sinusoidal or periodic function describing the output of VCO 42 corresponds to a phase shift rate, VCO 42 may be suitably controlled to provide a frequency adjustment ($\Delta f$) corresponding to a desired phase shift rate ($d\phi/dt = \phi(t) = 2\pi\Delta f$), the expression for the argument ($\Delta\phi(t)$) given in Equation (16):

$$2\pi\Delta ft = \Delta\phi(t) = 2\pi(Vt)^2 / \lambda R_M \quad (17)$$

Examining the frequency adjustment term:

$$2\pi\Delta f = 2\pi V^2 t/\lambda R_M \quad (18)$$

In other words:

$$\Delta f = V^2 t/\lambda R_M \quad (19)$$

Equation (19) may be generalized to include the effect of squinting the antenna by an angle $\theta$ from a side-looking orientation, by the inclusion of the factor $\cos \theta$ in the expression for V:

$$\Delta f(t) = V^2 \cos^2\theta t/\lambda R_M \quad (20)$$

In the alternative replica generator arrangement of FIG. 5, a signal indicative of the scaled velocity term $V \cos \theta$ is squared by a function generator 44, and the resultant signal ($V^2\cos^2\theta$) multiplied by a signal indicative of the inverse of radar range time ($K/T = 1/R_M$) and also by another signal indicative of cyclical processing time ($t = n/PRF$), and suitably scaled to provide a signal indicative of the argument, $2\pi V^2\cos^2\theta t./\lambda R_M$, by means of multipliers 37 and 39. Thus, the total argument generated by VCO 42 is ($2\pi f_o + 2\pi V^2\cos^2\theta t/\lambda R_M$)t, where $f_o$ is the offset frequency.

The output of VCO 42 may be single-side band multiplied with the coherent receiver reference signal frequency $f_{IF}$ (from transmitter 15 in FIG. 2), for modulation thereof prior to application to the reference input 29 of phase detector 14. Such modulation effects both frequency and phase modulation of the IF reference signal $f_{IF}$, as is more fully explained in co-pending U.S. application Ser. No. 512,335 filed Dec. 8, 1965, now U.S. Pat. No. 3,450,869, for High Sensitivity Unambiguous Correlator by Carl A. Wiley, et al., and owned by North American Rockwell Corporation, assignee of the subject application. In other words, the modulated resultant, $E_{mod}$ is:

$$E_{mod} = E_r e^{j(w_{IF}t+\phi_0)} E_0 e^{-j(w_1 t+\Delta\phi(t))} \quad (21)$$

$$E_{mod} = E_r E_0 e^{j[(w_{IF}+w_1)t+\phi_0+\Delta\phi(t)]} \quad (22)$$

where:
$E_r$ = amplitude of the IF reference to-be-modulated
$E_o$ = amplitude of the VCO output
$W_{IF}$ = IF reference frequency (in radians)
$w_1$ = offset frequency (in radians)
$\phi_o$ = time phase of IF reference signal
$\Delta\phi(t)$ = phase modulation imparted by doppler replica generator.

Random phase noise due to vibrations of the antenna about the ideal flight trajectory (as indicated in FIG. 1) may exist, and will degrade the processor performance. If desired, such errors can in practice be compensated by an inertial sensing device, located on the antenna, and responsive to accleration along the antenna boresight axis ($\ddot{R}$) for providing a voltage signal ($E_R$) which is proportional to the change in distance along the antenna boresight axis (i.e., $E_R = 4\pi/\lambda\Delta R = 4\pi/\lambda \int\int \ddot{R} dt^2$), which voltage may be scaled and added to the phase correction signal at the output of the multiplier (39) in FIG. 4. Alternatively a voltage indicative of the first integral of $\ddot{R}$ would be added to the control input to VCO 42 on the arrangement of FIG. 5. However, in many applications, the inertia of the antenna, and the integration time of the processor are such that these corrections are usually not required.

Accordingly, it is to be appreciated that the concept of the invention provides a simple and effective mechanization for omni-range focusing or azimuth cross correlation in a synthetic array application of a pulsed radar system.

Although the invention has been described and illustrated in detail, it is to be clearly understood that the same is by way of illustration and example only.

I claim:

1. In a side-looking synthetic antenna type coherent radar adapted for airborne use, and having a stable intermediate frequency reference source and a clutter-reference intermediate frequency receiver stage, doppler data focusing means comprising
   a phase sensitive detector having a first input coupled to an output of said intermediate frequency receiver stage and further having a second reference input for providing a video output; and
   compensatory phase-shift means intercoupling an output of said reference source and said reference input of said phase sensitive detector, and being responsive to the platform velocity and system pulse repetition frequency of said radar system for modulating said reference input to said phase sensitive detector to provide doppler focusing of said video output of said detector for a preselected region of radar ranges.

2. The device of claim 1 in which said compensatory phase shift means includes function generator means for controlling said modulation in accordance with the function, $(Vt)^2/R_M$,
where:
   $V$ = platform velocity
   $t$ = cyclical doppler processing time
   $R_M$ = periodic radar range time.

3. In a side-looking synthetic antenna type coherent radar adapted for airborne use, and having a stable intermediate frequency reference source, a clutter-referenced intermediate frequency receiver stage, doppler data focusing means comprising
   a phase sensitive detector having a first input coupled to an output of said intermediate frequency receiver stage and further having a second reference input;
   a voltage-controlled phase shifter intercoupling an output of said reference source and said reference input of said phase sensitive detector, and further having a control input; and
   control means responsive to the platform velocity of said radar for generating a doppler focusing control output signal as a function of both radar system range time and the system doppler processing interval,
   said control input of said voltage controlled phase shifter being responsive to said doppler focusing control output signal.

4. The device of claim 3 in which said control means includes function generator means responsive to platform velocity V, radar range time $R_M$ and doppler processing interval for generating a control signal indicative of the function, $2\pi V^2 t^2/\lambda R_M$, where $\lambda$ is the wavelength of said radar.

5. In a side-looking synthetic antenna type coherent radar adapted for airborne use and having a stable intermediate frequency reference source and a clutter-referenced intermediate frequency receiver stage, the improvement of data focusing means comprising
   a phase sensitive detector having a first input coupled to an output of said intermediate frequency receiver stage and further having a second reference input;
   a voltage-controlled phase shifter intercoupling an output of said reference source and said reference input of said phase sensitive detector, and further having a control input;
   control means for generating a doppler focusing control output signal indicative of the relationship:

$$\Delta\phi(t) = 2\pi/\lambda \ (Vt)^2/R_M$$

where:
   $\lambda$ = radar transmitter wavelength
   $V$ = radar platform velocity
   $R_M$ = radar range time
   $t$ = cyclical time over the doppler processing interval
said control input of said voltage controlled phase shifter being responsive to said doppler focusing signal.

6. The device of claim 5 in which said control means comprises
   first function generator means responsive to the platform velocity V of said radar and to cyclical doppler processing time $t$ for generating a signal indicative of the square of the product of V and $t$,
   second function generator means responsive to an output of said first function generator means and a system trigger of said radar for modulating said output of said first function generator means as an inverse function of radar range time.

7. In a side-looking synthetic antenna type coherent radar adapted for airborne use, and having a stable intermediate frequency reference source, a clutter-referenced intermediate frequency receiver stage, the improvement data focusing means comprising
   a phase sensitive detector having a first input coupled to an output of said intermediate frequency receiver stage and further having a second reference input;
   modulation means intercoupling an output of said reference source and said reference input of said phase sensitive detector, and further having a modulation control input;
   modulation control means responsive to the platform velocity of said radar for generating a modulating control signal as a function of both radar system range time and the system doppler processing interval,
   said modulation control input of said modulation means being responsive to said modulating signal.

8. The device of claim 7 in which said modulation means comprises a single sideband modulator and in which said modulating signal means comprises a voltage controlled oscillator and means for varying the frequency of said oscillator by an mount $\Delta f$ in accordance with the relationship:

$$\Delta f = V^2 t/\lambda R_M$$

where:
   $V$ = radar platform velocity
   $t$ = periodic doppler processing time
   $R_M$ = radar range time
   $\lambda$ = radar system transmitter wavelength.

9. The device of claim 7 in which said means for generating comprises
   first function generator means for generating an output signal indicative of the function $V^2$;
   inverse function generator means responsive to a system trigger of said radar for modulating said output signal of said first function generator as an inverse function $1/R_M$ of periodic range time;
   third function generator means for modulating the output of said inverse function generator means as a direct function of periodic time $t$; and voltage controlled oscillator means responsive to said doubly modulated output of said third function generator for providing a modulating control signal input to said modulating means.

10. The device of claim 7 in which said means for generating comprises
first function generator means responsive to the platform velocity of said radar for generating an output signal indicative of the function $V^2 \cos^2\phi$;
second function generator means responsive to a system trigger of said radar for modulating said output signal of said first function generator as an inverse function of periodic range time and as a direct function of a periodic doppler processing interval; and
voltaged controlled oscillator means responsive to said modulated output of said second function generator for modulation control of said modulating means.

11. A coherent radar system having a simplified in-focus synthetic antenna mode, comprising
a side-looking antenna;
a pulsed coherent radio frequency transmitter output coupled to said antenna;
a receiver having an input coupled to said antenna and further having an intermediate frequency stage including an auxiliary local oscillator injection input;
doppler frequency tracking means responsive to an output of said intermediate frequency stage for providing an auxiliary local oscillator signal at said injection input of said intermediate frequency stage, whereby said output of said intermediate frequency stage is clutter referenced;
phase sensitive detector means having a first input coupled to said output of said intermediate frequency stage and further having a reference second input responsively coupled to a coherent source of a reference intermediate frequency signal for providing a video output; and
compensatory phase-shift means responsive to the platform velocity and system pulse repetition frequency of said radar system for modulating said reference input to said phase sensitive detector to provide doppler focusing of said video output of said detector for a preselected region of radar ranges.

12. The device of claim 11 in which said compensatory phase shift means comprises
first function generator means for generating an output signal indicative of the function $V^2\cos^2\phi$;
inverse function generator means responsive to a system trigger of said radar for modulating said output signal of said first function generator as an inverse function of periodic range time;
third function generator means for modulating the output of said inverse function generator means as a direct function of a periodic doppler processing interval;
voltage controlled oscillator means responsive to said doubly modulated output for generating a modulation control signal output; and
single sideband modulation means interposed between said output of said coherent source and said second input of said phase detector and having a modulation input responsive to the control signal output of said oscillator means.

13. The device of claim 7 in which said compensatory phase shift means comprises
first function generator means responsive to the platform velocity of said radar for generating an output signal indicative of the function $V^2$;
second function generator means responsive to a system trigger of said radar for modulating said output signal of said first function generator as an inverse function of periodic range time and as a direct function of a periodic doppler processing interval;
voltage controlled oscillator means responsive to said modulated output of said second function generator for generating a control signal; and
said sideband modulation means interposed betwen said output of said coherence source and said second input of said phase detector and having a control input responsive to the control signal output of said oscillator means.

* * * * *